(12) United States Patent
Chen et al.

(10) Patent No.: US 6,243,385 B1
(45) Date of Patent: Jun. 5, 2001

(54) SIMULTANEOUS MULTI-USER/SINGLE CONNECTION INTERNET ACCESS METHOD AND SYSTEM

(75) Inventors: Wilson Chen; Ben Lin, both of Hsinchu (TW)

(73) Assignee: SerComm Corp. (TW)

( * ) Notice: Subject to any disclaimer, the term of this patent is extended or adjusted under 35 U.S.C. 154(b) by 0 days.

(21) Appl. No.: 09/235,692

(22) Filed: Jan. 22, 1999

(51) Int. Cl.[7] .............................. H04L 12/28; H04L 12/56
(52) U.S. Cl. ........................................ 370/401; 379/88.17
(58) Field of Search .................................... 370/401, 216, 370/219, 220, 402, 901, 903, 908, 910, 911, 352, 356; 395/181, 182.04, 200.33, 200.46, 200.57, 200.58, 200.52; 711/162, 154; 379/88.17, 93.09, 93.11, 93.14, 93.05

(56) References Cited

U.S. PATENT DOCUMENTS

| | | | |
|---|---|---|---|
| 5,513,314 | * 4/1996 | Kandasamy et al. | 364/245.3 |
| 5,657,446 | * 8/1997 | Pinard et al. | 379/93.09 |
| 5,754,752 | * 5/1998 | Sheh et al. | 709/227 |
| 5,764,890 | * 6/1998 | Glasser et al. | 380/25 |
| 5,774,527 | * 6/1998 | Handelman et al. | 379/93.07 |
| 5,805,587 | * 9/1998 | Norris et al. | 370/352 |
| 5,835,953 | * 11/1998 | Ohran | 711/162 |
| 5,852,724 | * 12/1998 | Glenn, II et al. | 709/200.75 |
| 5,862,346 | * 1/1999 | Kley et al. | 395/245.3 |
| 5,959,988 | * 9/1999 | Bjorkman et al. | 370/389 |
| 5,970,088 | * 10/1999 | Chen | 370/201 |
| 5,974,442 | * 11/1999 | Adams | 709/200 |
| 5,978,565 | * 11/1999 | Ohran et al. | 714/13 |

* cited by examiner

Primary Examiner—Dang Ton
Assistant Examiner—Phirin Sam
(74) Attorney, Agent, or Firm—Greer, Burns & Crain, Ltd.

(57) ABSTRACT

A method and a system for a plurality of computers to connect to the Internet by a single active phone line is provided. A server is auto-selected to provide Internet access to said plurality of computers through said single active phone, and when the server is not valid, another server will be selected from said plurality of computers to continuously provide the Internet accesses.

17 Claims, 5 Drawing Sheets

SIMULTANEOUS MULTI-USER/SINGLE CONNECTION INTERNET ACCESS METHOD AND SYSTEM

FIELD OF THE INVENTION

The present invention relates to an Internet access method and system, and more particularly to a method and system for sharing a single active phone line across a network for connecting to the Internet.

BACKGROUND OF THE INVENTION

Currently, Internet access is important for email, information search and E-commerce. To provide Internet access for a user, one ISP account, one phone line, one modem, and a personal computer are needed. However, in a simultaneous multi-user system, such as a local area network (LAN) built in an office, it will spend a considerable cost to provide ISP accounts and phone lines for all of the computers. To solve this problem, program products for multi-users to share one modem and single active phone line are developed. The conventional multi-user/single modem system 1 is illustrated in FIG. 1. There is a plurality of computers 11, 12, . . . , 15, etc., connected by a local area network (LAN) 10. There is only one computer, i.e. the computer 12, which provides Internet access. The computer 12 is connected with a modem 121 and a telephone terminal 122, and is called a "server". There is only one server 12 in the multi-user system 1. The server itself, with no problem, can connect to the Internet with a telephone and an ISP account. Other computers in the network, equipped with no modem, cannot connect to the Internet directly. Instead, data for Internet access are transmitted to the server 12 through LAN 10. The server 12 converts the private unregistered IP address into the global registered IP address by a network address translator (NAT) technique. The registered IP address is then transmitted to the Internet. Data responded by the Internet is transmitted to the server 12 and the server 12 will identify and send data received from Internet to the right computer of the system 1.

Since the conventional system 1 has only one fixed server 12, many problems will happen. If the server 12 is invalid because of being turned off or other reason, all the user of the system 1 will not be able to connect to the Internet. Accordingly, the server 12 must be kept on turned and operated continuously. Such a situation will be inconvenient for the user and the life of the server 12 will be shortened. Additionally, to keep the power turned on continuously is wasteful. It is then attempted by the present invention to solve the above-mentioned problems.

SUMMARY OF THE INVENTION

An object of the present invention is to provide a method and a system for auto-selecting a server from a plurality of computers to provide Internet access.

The other object of the present invention is to provide a method and a system which can automatically select another server for providing Internet access across the network when the present server is invalid.

The method of the present invention is used for a plurality of computers to connect to the Internet by a single active phone line. The method includes steps of: (a) selecting a server from the plurality of computers for providing Internet access to the plurality of computers through the single active phone line; (b) identifying whether the server is valid or not; and (c) selecting another server from the plurality of computers for providing Internet access to the plurality of computers through the single active phone line when the server is not valid.

The server and the another server are preferably connected to at least one modem. The plurality of computers are preferably connected by a network. The steps of the present invention are preferably executed by software installed on each one of the plurality of computers respectively.

The step (b) preferably includes steps of: (b1) requesting the server to respond; and (b2) initiating the step (c) when the server does not respond. The step (b1) preferably includes steps of : (b11) setting a request number; (b12) sending a request signal from one of the plurality of computers to other ones of the plurality of computers and waiting for a response from the server in a period of time; (b13) repeating the step (b12) when the response is not received by the one of the plurality of computers within the period of time; and (b14) initiating the step (c) when the repeated number of the step (b12) exceeds the request number.

Preferably, the method further includes steps of: (b01) checking whether the one of the plurality of computers is the server connected with a modem or not; (b02) checking whether the modem is valid or not; (b03) sending a packet representing that the server is not valid when the modem is not valid; and (b04) initiating the step (c) in the other ones of the plurality of computers in response to the packet representing that the server is not valid.

The step (c) executed in one of the plurality of computers preferably includes steps of: (c1) checking whether the one computer is connected with one modem or not; (c2) checking whether the one computer is selected as the another server or not when the one computer is connected with one modem; and (c3) informing other ones of the plurality of computers that the one computer is the another server when the one computer is selected as the another server.

Preferably, the step (c2) includes steps of: (c21) checking whether the one computer is assigned as the another server or not, and executing the step (c3) when the one computer is assigned as the another server; (c22) broadcasting to the other computers that the one computer requests for being the another server if the one computer is not assigned as the another server; and (c23) executing the step (c3) if no response from the other computers is received.

The step (c22) preferably includes steps of: (c221) setting a broadcasting number; (c222) broadcasting to the other computers that the one computer requests for being the another server; (c223) repeating the step (c222) when no response from the other computer is received; and (c224) executing the step (c23) when the repeated number of the step (c222) exceeds the broadcasting number.

Preferably, the method further includes steps of:
(c2221) identifying whether the another computer is the server or not if a response from another computers is received; and
(c2222) selecting the another server from the one computer and the another computer if the another computer is not the server.

The step (c2222) may include steps of: (c22221) comparing the addresses of the computer and the another computers; and (c22222) determining the another server according to the comparison result of the step (c22221).

There may further include steps for one of the plurality computers other than the server to connect to Internet through the single active phone line: (d) identifying the server from the plurality of computers; (e) setting an parameter for performing Internet access from the one computer through the server; and (f) setting another parameter for performing Internet access from the one computer through the another server if a packet from the another server is received.

The step (d) preferably includes steps of: (d1) checking whether the server is identified by the one computer or not; (d2) requesting the server if the server is not identified by the one computer; and (d3) noticing the user of the one computer if the server is not find in the step (d2).

The step (d2) preferably includes steps of: (d21) setting a request number; (d22) sending a packet to other ones of the computers to request for the server; (d23) executing the step (e) if a packet from the server is received; (d24) repeating the step (d22) if no packet from the server is received; and (d25) executing the step (d3) if the repeated number of the step (d22) exceeds the request number.

The present invention further provides a system for a plurality of computers to connect to the Internet by a single active phone line. The system includes a server including one of the plurality of computers connected with one modem, wherein the plurality of computers are connected to the single active phone line through the server; and at least one sub-server including another one of the plurality of computers connected with one modem; wherein if the server is invalid, another server selected from the at least one sub-server is provided for the plurality of computers to connect to the Internet through the single active phone line. The plurality of computers preferably forms a local area network(LAN).

The present invention may best be understood through the following description with reference to the accompanying drawings, in which:

DETAILED DESCRIPTION OF THE PREFERRED EMBODIMENTS

Figure 1:
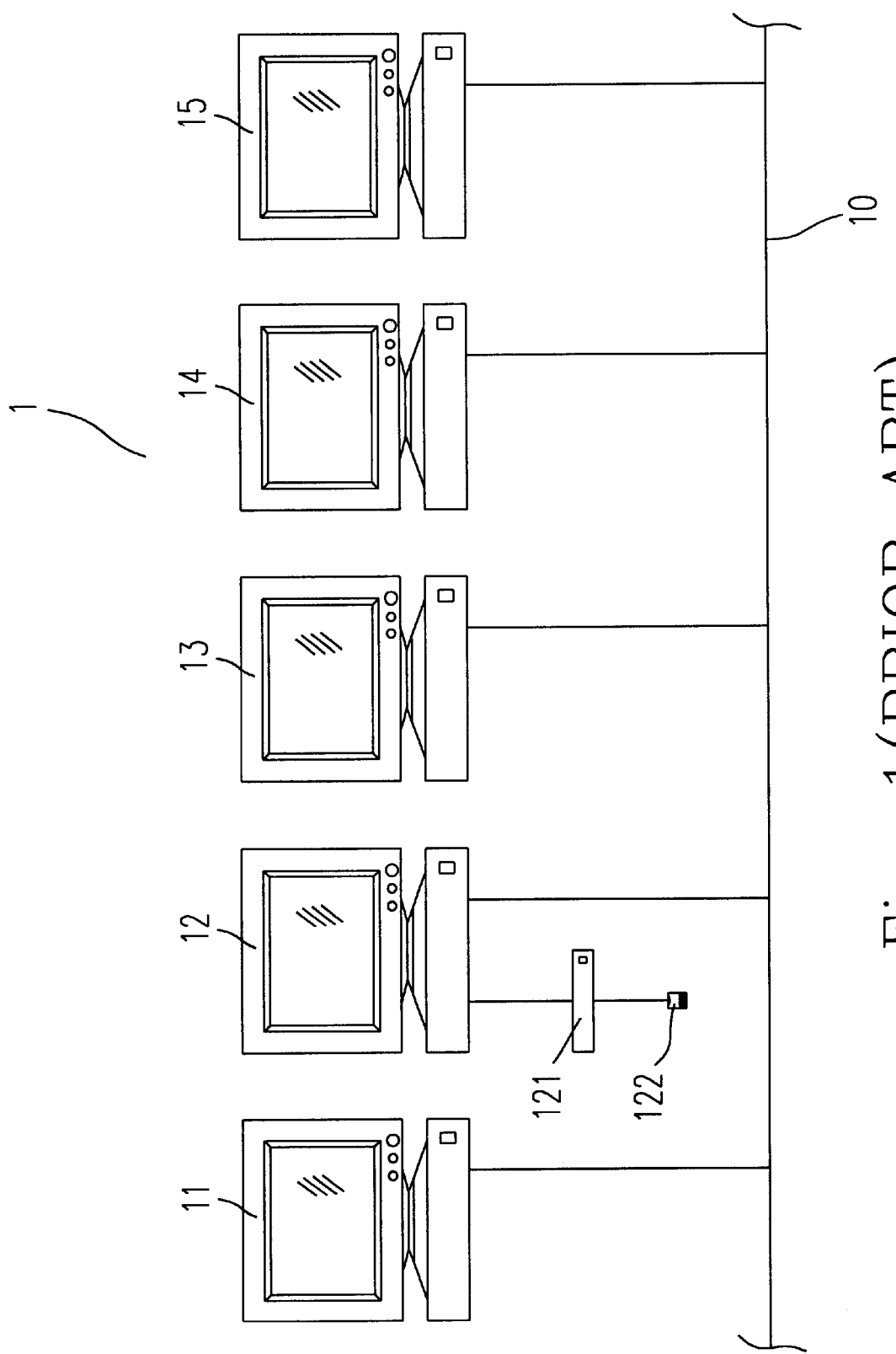
FIG. 1 illustrates a conventional multi-user/single-modem system.
Figure 2:
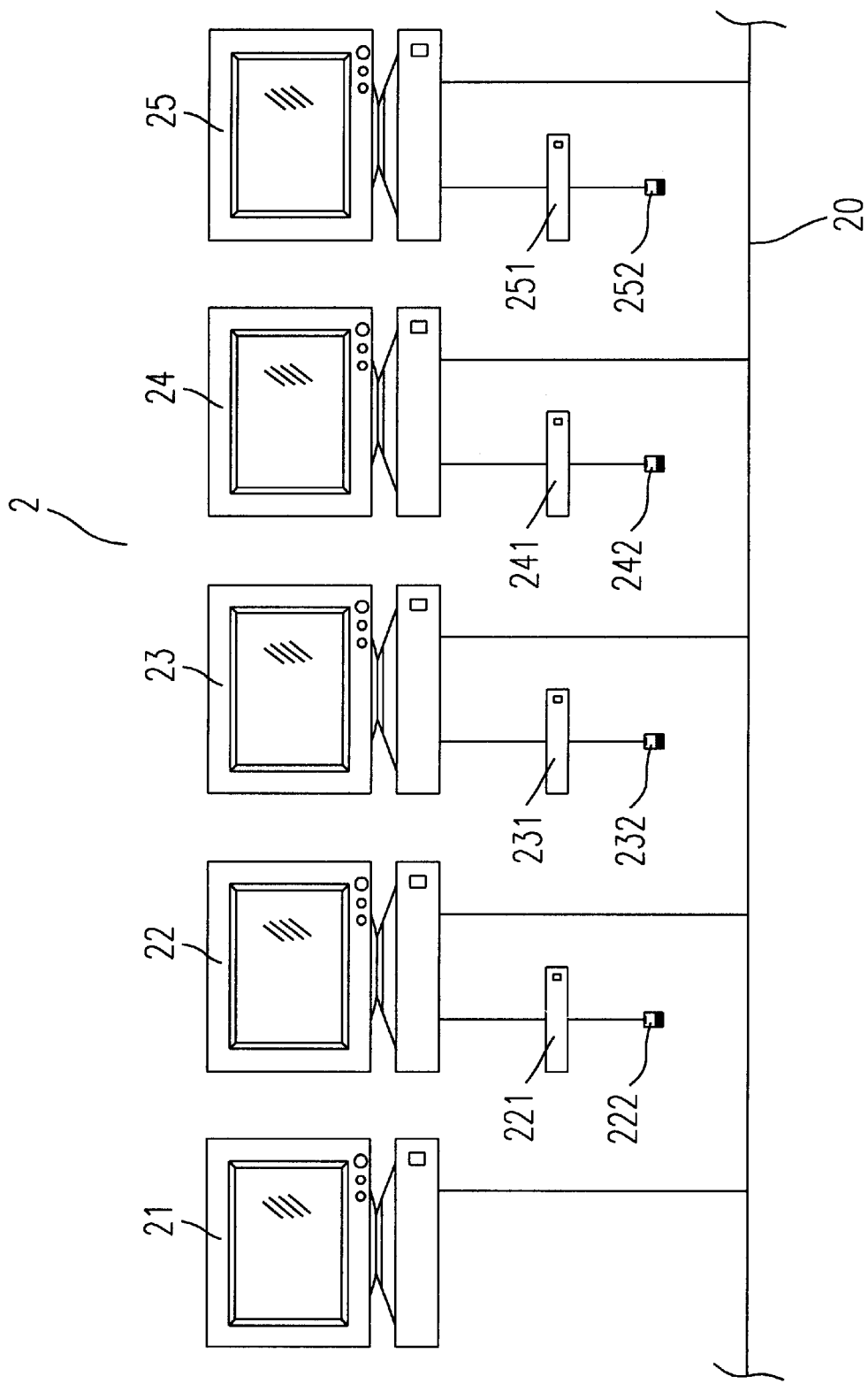
FIG. 2 illustrates a preferred embodiment of a multi-user/single-connection system according to the present invention.

According to a market investigation, the personal computers equipped with modems occupy a remarkable portion of the currently used personal computers. Accordingly, the present invention attempts to solve the above-mentioned problems by utilizing such a situation. FIG. 2 illustrates a preferred embodiment of a multi-user/single-connection system 2 according to the present invention. The system 2 includes a plurality of personal computers 21, 22, . . . 25, etc. The computers are connected by a local area network 20. The computers 22, 23, 24, 25 are connected with the modems 221, 231, 241, 251 respectively. Additionally, the modems 221, 231, 241, 251 are connected to the phone line adapters 222, 232, 242, 252 respectively. If there is only one telephone (not shown) available, the adapter 222, 232, 242, 252 may be jointed together so that modems 221, 231, 241, 251 are connected to the same phone line. However, when the system is working, only one of these modems is operated. That is, there is only one active phone line in the system.

The computer connected with the working modem is called a "server". The server can provide Internet accesses for all the computers in the system simultaneously. The other computers connected with modems are "sub-servers". The sub-servers are capable of but not currently providing Internet accesses to the computers of the system. Of course, there may be computers which are not a server or a sub-server.

According to the present invention, there is only one server in the system. Therefore, only one ISP account and one telephone line are needed. In comparison with the conventional system, the server of the present invention is not fixed but can be selected from the sub-servers. The server-selecting operation can be performed by software installed on each of the computers in the system. The server, connected with a single active telephone line of the system, provides Internet connections for all the computers of the system. When the server is turned off or invalid, another server is selected from the sub-servers.

For example, as shown in FIG. 2, if the computer 22 is selected to be the server, the computers 23, 24 and 25 become sub-computers. Although these computers are connected with the modems 231, 241 and 251 respectively, only the modem 221 is valid and connected with the active phone line.

It is no problem for the user to connect to the Internet by the computer 22 through its connected modem 221 and the active phone line. However, if the user of the other computer such as the computer 21 or the computer 24 wants to connect to the Internet, a NAT technique is utilized by the server 22 to translate the internal IP address to the registered external IP address. The server 22 will send the translated address to the Internet. Furthermore, when data is sent back from the Internet to the system 2, the server 22 will identify the data and transmit it to the right computer through the LAN 20.

When the server 22 is invalid, such a situation will be detected by the software installed on each computer and another server is thus automatically selected from the sub-servers 23, 24, and 25. The software can be performed by any computer language. If the user of one of the computers in the system 2 wants to connect to the Internet, the software must be installed on this computer.

Figure 3:
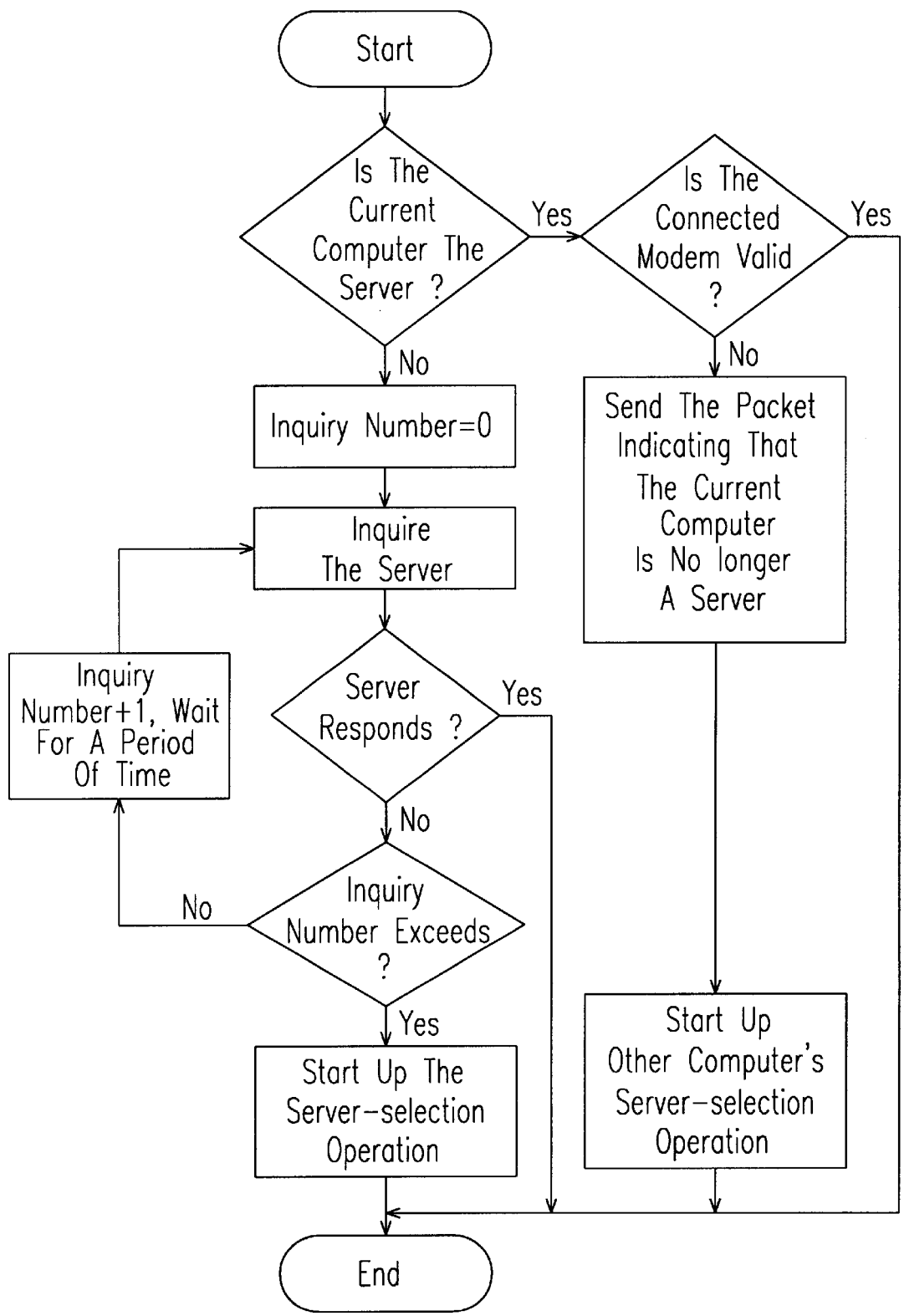
FIG. 3 is a flowchart showing a preferred embodiment of situations for starting up the operation of selecting a server according to the present invention.

For describing the present invention more clearly, the method of the present invention is divided into four main portions:

1. The occasion for auto-selecting the server
2. The conditions of a computer capable of executing the server-selection operation
3. The operation of server auto-selection
4. The operation of a "non-server" computer Now the four portions are described below:

1. The Occasions for Auto-Selecting the Server 1.1 No Response is Received to a Broadcast of Inquiring for the Server A preferred flowchart of this portion is shown in FIG. 3. Any one of the computers in the system can broadcast to find the server. This step can be utilized to identify whether the current server is valid or not. When the server does not respond to the broadcasting, this step may be repeated after a period of time. If such a step has been repeated a certain number, the procedures for auto-selecting the server will be executed to find a new server. The waiting time and the repeated number can be modified by the user, and their values can be changed during the operation.

The server-inquiring steps can be executed in many occasions. For example, when the program installed in a computer is started, these steps must be executed to find the server. Furthermore, the server-inquiring steps can be executed periodically for monitoring whether the current server is valid or not.

1.2 The Server Announces that it is No Longer a Server

Except for the broadcasting steps, the auto-selection of the server can also be started up by the current server itself. If the server detects that the connected modem is invalid, or if the server itself is going to be turned off, it will send a packet to the other computers to announce that it will be no longer a server. The other computers will execute the server auto-selection steps when receiving the packet.

The packet from the server can also directly assign a sub-server to be the next server. However, to perform this function, the sub-servers in the system must be identified by the server. The information about whether a computer in the system is a sub-server or not can be transmitted to the server with the server-inquiring packet.

2. The Conditions of a Computer Capable of Executing the Server-Selection Operation Only a computer connected with a modem can execute the operation. Of course, the software must be installed on this computer.

3. The Operation of the Server Auto-Selection

Figure 4:
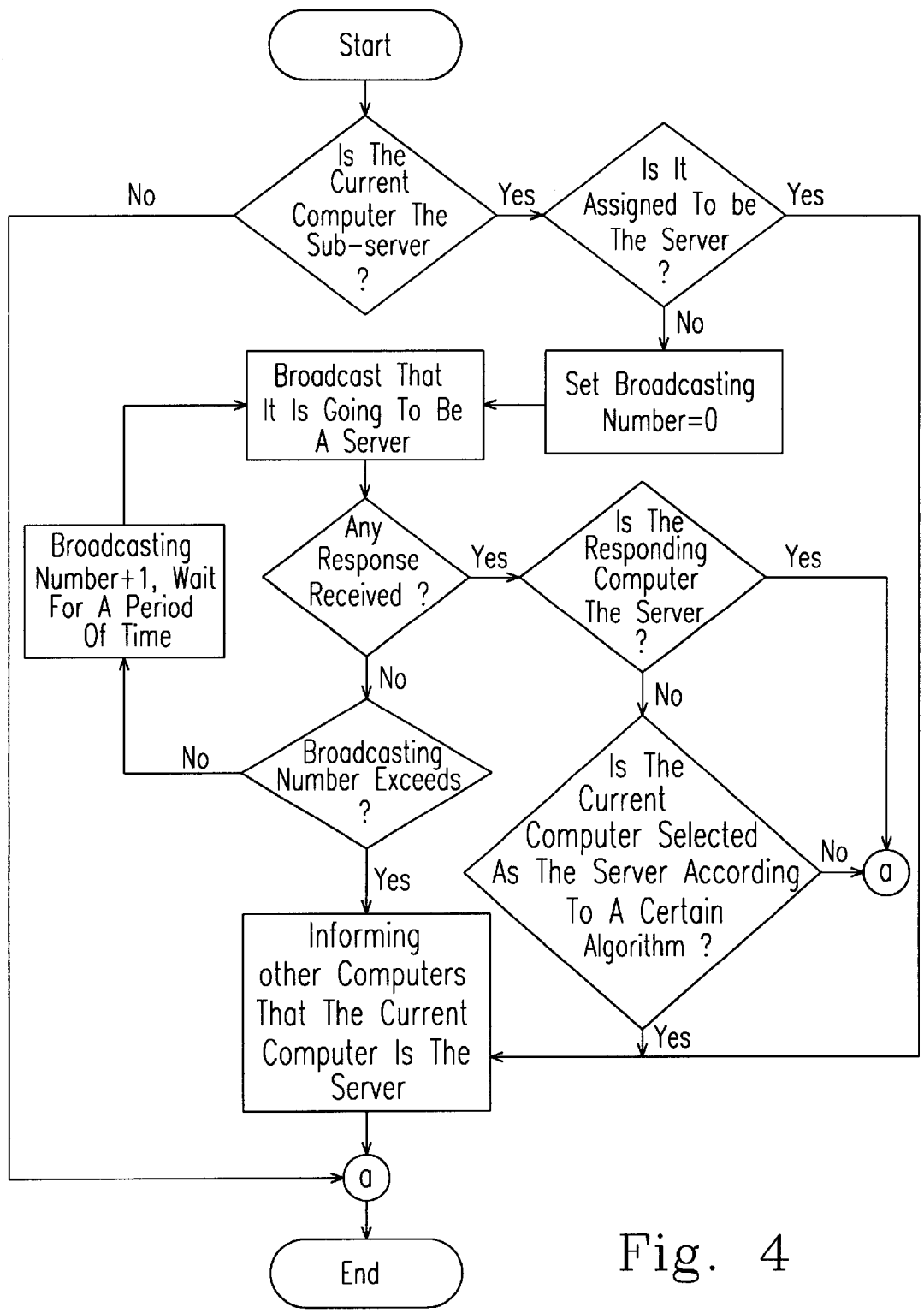
FIG. 4 is a flowchart indicating a preferred embodiment of the operation for selecting a server according to the present invention.

FIG. 4 illustrates a flowchart of a preferred server-selection operation. When any of the occasions described in 1.1 or 1.2 meets, the server-selection operation will be started up.

3.1 The operation will be executed by a computer meeting the conditions of operating the server-selection. If the operation is started up by event 1.1, or by event 1.2 but the next server is not assigned, the computer will broadcast to the other computers with packet announcing that it will become the server if no such a packet is received from the other computers.

3.1.1 If the packet has been broadcast by a certain computer for a certain number during a certain time period and no response from the other computers is received, this computer becomes the server.

Basically, the values of the packet number and the time period cannot be modified by the user.

3.1.2 If there is a response received from a current server during the time period, the broadcasting computer will terminate the operation and becomes a sub-server.

3.1.3 If such a packet has been broadcast, and similar packet(s) from the other computer(s) is(are) received during a period of time, only one of these computers will be selected as the server according to certain algorithm. For example, the addresses of these computers can be compared, and the one which has the highest or lowest address will be selected as the server.

3.1.4 Once a certain computer becomes the new server, it will broadcast this fact to the other computers.

3.2 If the operation is started by the event 1.2 and the new server has been assigned, the assigned computer becomes the new server. It will immediately broadcast to the other computers this fact.

4. The Operation of a "Non-Server" Computer

Figure 5:
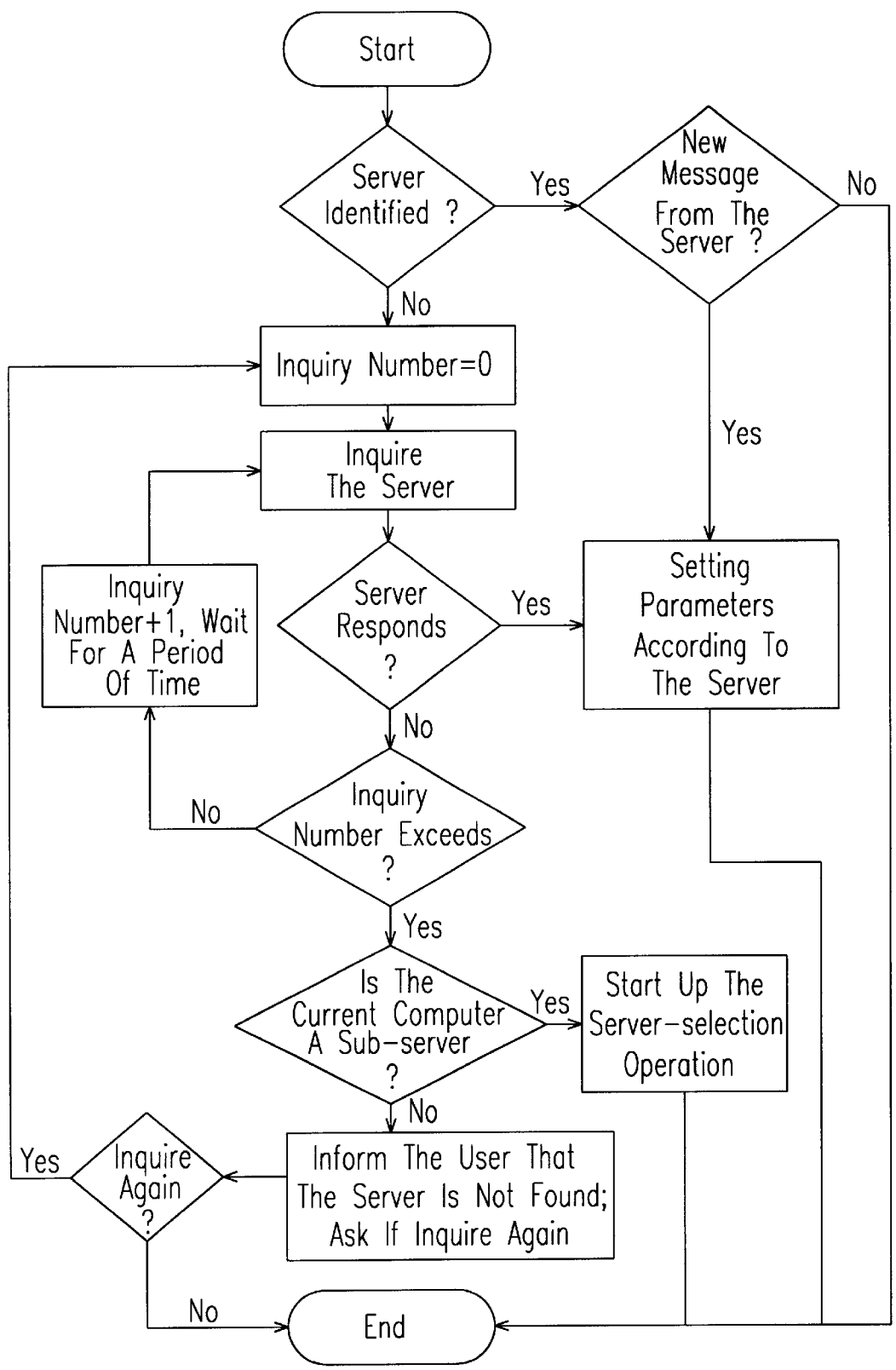
FIG. 5 is a flowchart illustrating a preferred embodiment of the operation of a computer that is not a server according to the present invention.

According to the present invention, the "non-servers" in the system, which include sub-servers and other computers which are not equipped with modems, can operate as shown in FIG. 5.

4.1 If a "non-server" computer receives a packet from a new server, it will identify whether the new server and the current server are the same or not. If they are not the same, the set parameters are modified according to the new server in order to connect to the Internet through the new server.

4.2 If the "non-server" computer cannot identify the server, it must inquire the server by broadcasting.

4.2.1 If the inquiring is repeated for a certain number of times during a time period, and there is no response from the server, the "non-server" computer will inform this result to the user and identify whether the user will to proceed with another inquiry or not. If the user says "yes", steps of 4.2.1 are repeated. Furthermore, the new server can also be directly assigned by the user in this moment.

Basically, the values of the time period and the repeated number are the same as the ones in steps of 1.1.

Before repeating steps of 4.2.1, it is preferred to identify whether the current computer is a sub-server or not. If so, the server auto-selection operation can be started up directly.

4.2.2 If a response from the new server is received, the setting parameters are modified according to the new server in order to access the Internet.

Because the server of the present invention is selected among the sub-servers, the problems caused by the fixed server of a conventional system are solved. The Internet access will no longer be limited by the operation conditions of the server and its connected modem. When any problem occurs on the server or the working modem, it will be detected and another server will be selected automatically. Furthermore, the server will not have to be kept on the turn-on state. Another server will be selected when the server is turned off. Accordingly, the cost of the power is saved and the life of the computers is prolonged. Therefore, the present invention is more convenient, reliable, and cheaper than the conventional Internet sharing method and system.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for a plurality of computers to connect to the Internet by only a single active phone line, said method comprising steps of:
(a) selecting a server from said plurality of computers for providing Internet access to said plurality of computers through said single active phone line;
(b) identifying whether said server is valid or not;
(c) selecting another one of said plurality of computers for providing Internet access to said plurality of computers through said single active phone line when said server is not valid;
(d) identifying said server from said plurality of computers;
(e) setting a parameter for performing Internet access from said one computer through said server; and
(f) setting another parameter for performing Internet access from said one computer through said another one of said plurality of computers if a packet from said another one of said plurality of computers is received;
wherein step (d) includes steps of:
(d1) checking whether said server is identified by said one computer or not;

(d2) requesting for said server if said server is not identified by said one computer; and (d3) noticing the user of said one computer if said server is not found in said step (d2).

2. A method according to claim 1 wherein said server and said another one of said plurality of computers are connected to at least one modem.

3. A method according to claim 1 wherein said plurality of computers are connected by a network.

4. A method according to claim 1 wherein said step (b) is executed by each of said plurality of computers respectively.

5. A method according to claim 1 wherein said step (b) includes steps of:

(b1) requesting said server to respond; and (b2) initiating said step (c) when said server does not respond.

6. A method according to claim 5 wherein said step (b1) includes steps of:

(b11) setting an inquiry number;

(b12) sending an inquiring signal from one of said plurality of computers to other ones of said plurality of computers and waiting for a response from said server in a period of time;

(b13) repeating said step (b12) when said response is not received by said one of said plurality of computers within said period of time; and (b14) initiating said step (c) when the repeated number of said step (b12) exceeds said inquiry number.

7. A method according to claim 6, further includes steps of:

(b01) checking whether said one of said plurality of computers is said server connected with a modem or not;

(b02) checking whether said modem is valid or not;

(b03) sending a packet representing that said server is not valid when said modem is not valid; and (b04) initiating said step (c) in the other ones of said plurality of computers in response to said packet representing that said server is not valid.

8. A method according to claim 1, wherein said step (c) is executed by each one of said plurality of computers respectively.

9. A method according to claim 8, wherein said step (c) executed in one of said plurality of computers includes steps of:

(c1) checking whether said one computer is connected with one modem or not;

(c2) checking whether said one computer is selected as said another one of said plurality of computers or not when said one computer is connected with one modem; and (c3) informing other ones of said plurality of computers that said one computer is said another one of said plurality of computers when said one computer is selected as said another one of said plurality of computers.

10. A method according to claim 9 wherein said step (c2) includes steps of:

(c21) checking whether said one computer is assigned as said another one of said plurality of computers or not, and executing said step (c3) when said one computer is assigned as said another one of said plurality of computers;

(c22) broadcasting to the other computers that said one computer requests for being said another one of said plurality of computers if said one computer is not assigned as said another one of said plurality of computers; and (c23) executing said step (c3) if no response from the other computers is received.

11. A method according to claim 10 wherein said step (c22) includes steps of:

(c221) setting a broadcasting number;

(c222) broadcasting to the other computers that said one computer requests for being said another one of said plurality of computers;

(c223) repeating said step (c222) when no response from the other computer is received; and (c224) executing said step (c23) when the repeated number of said step (c222) exceeds said broadcasting number.

12. A method according to claim 11, further includes steps of:

(c2221) identifying whether said another computer is said server or not if a response from another computers is received; and (c2222) selecting said another one of said plurality of computers from said one computer and said another computer if said another computer is not said server.

13. A method according to claim 12, wherein said plurality of computers have addresses respectively, and said step (c2222) includes steps of:

(c22221) comparing said addresses of said computer and said another computers; and (c22222) determining said another one of said plurality of computers according to the comparison result of said step (c22221).

14. A method according to claim 1, wherein said step (d2) includes steps of:

(d21) setting an inquiry number;

(d22) sending a packet to other ones of said computers to request for said server;

(d23) executing said step (e) if a packet from said server is received;

(d24) repeating said step (d22) if no packet from said server is received; and (d25) executing said step (d3) if the repeated number of said step (d22) exceeds said inquiry number.

15. A method according to claim 14 wherein in said step (d25), further comprising a step before said step d3) is executed (d251) identifying whether said one computer is connected with a modem or not; and (d252) executing said step (c) if said one computer is not connected with a modem.

16. A method for a plurality of computers to connect to the Internet by only a single active phone line, said method comprising steps of:

(a) selecting a server from said plurality of computers for providing Internet access to said plurality of computers through said single active phone line;

(b) identifying whether said server is valid or not; and (c) selecting another server from said plurality of computers for providing Internet access to said plurality of computers through said single active phone line when said server is not valid, wherein said step (b) includes steps of:

(b1) requesting said server to respond; and (b2) initiating said step (c) when said server does not respond, wherein said step (b1) includes steps of:

(b11) setting an inquiry number;
(b12) sending an inquiring signal from one of said plurality of computers to other ones of said plurality of computers and waiting for a response from said server in a period of time;
(b13) repeating said step (b12) when said response is not received by said one of said plurality of computers within said period of time; and
(b14) initiating said step (c) when the repeated number of said step (b12) exceeds said inquiry number.

17. A method for a plurality of computers to connect to the Internet by only a single active phone line, said method comprising steps of:

(a) selecting a server from said plurality of computers for providing Internet access to said plurality of computers through said single active phone line;
(b) identifying whether said server is valid or not; and
(c) selecting another server from said plurality of computers for providing Internet access to said plurality of computers through said single active phone line when said server is not valid, wherein said step (c) is executed by each one of said plurality of computers respectively and includes steps of:
(c1) checking whether said one computer is connected with one modem or not;
(c2) checking whether said one computer is selected as said another server or not when said one computer is connected with one modem; and
(c3) informing other ones of said plurality of computers that said one computer is said another server when said one computer is selected as said another server.

* * * * *